(12) United States Patent
Borkowski et al.

(10) Patent No.: US 6,978,455 B1
(45) Date of Patent: Dec. 20, 2005

(54) TELLER/SCANNER SYSTEM AND METHOD

(75) Inventors: Joseph David Borkowski, Ann Arbor, MI (US); Weston Morris, Livonia, MI (US); Xiaozhou Ye, Castro Valley, CA (US)

(73) Assignee: Unisys Corporation, Blue Bell, PA (US)

( * ) Notice: Subject to any disclaimer, the term of this patent is extended or adjusted under 35 U.S.C. 154(b) by 0 days.

(21) Appl. No.: 09/363,766

(22) Filed: Jul. 29, 1999

Related U.S. Application Data

(60) Provisional application No. 60/101,118, filed on Sep. 21, 1998.

(51) Int. Cl.[7] .............................................. G06F 17/00
(52) U.S. Cl. ......................................... 718/1; 718/106
(58) Field of Search ................................ 709/310, 101, 709/311, 102, 328, 100, 208, 223, 220; 718/1, 718/106

(56) References Cited

U.S. PATENT DOCUMENTS

| | | | | |
|---|---|---|---|---|
| 5,909,545 A | * | 6/1999 | Frese, II et al. ........ | 395/200.38 |
| 5,995,916 A | * | 11/1999 | Nixon et al. ................ | 702/182 |
| 6,018,619 A | * | 1/2000 | Allard et al. .......... | 395/200.54 |
| 6,098,097 A | * | 8/2000 | Dean et al. ................. | 709/220 |
| 6,108,701 A | * | 8/2000 | Davies et al. ............... | 709/224 |
| 6,138,143 A | * | 10/2000 | Gigliotti et al. ............ | 709/203 |
| 6,256,637 B1 | * | 7/2001 | Venkatesh et al. .......... | 707/103 |
| 6,343,350 B1 | * | 1/2002 | LaMaire et al. ............ | 711/156 |

* cited by examiner

*Primary Examiner*—St. John Courtenay, III
*Assistant Examiner*—Andy Ho
(74) *Attorney, Agent, or Firm*—Lise A. Rode; Mark T. Starr

(57) ABSTRACT

A system and method for interfacing a single host application with multiple machines to be controlled by the host application via a local area network minimizes the complexity of dealing with multiple controlled entities by utilizing a single virtual state machine manager communicating with the host application. The virtual machine manager communicates with the controlled machines via machine proxies in conjunction with a command cache state machine and a command cache, which stores previous action requests generated by the host application. A machine epoxy is created for physical controlled entity attached to the system.

19 Claims, 4 Drawing Sheets

TELLER/SCANNER SYSTEM AND METHOD

This application claims benefit of provisional application 60/101,118, filed Sep. 21, 1998.

BACKGROUND OF THE INVENTION

1. Field of the Invention

The invention relates generally to a networked system of controlled machines, such as document processors, sharing a single control processing unit containing a host application for controlling the machines. More particularly, the invention concerns a mechanism for enabling relatively simple communication among a single application program and a plurality of controlled machines, such as document processors.

2. The Prior Art

With reference to FIG. 1, larger, more expensive document processors such as check processor 100 have conventionally been controlled by a dedicated central processing unit 102. This is true regardless of the speed of the check processing machine. Central processor 102 hosts the customer's application software and provides some (or all) of the data manipulation services for check processing machine 100. However, central processor 102 typically has excess processing power when used to control relatively low speed check processing machines 100. This means that a low speed check-processing machine 100 generally makes a very uneconomical use of a central processor 102 and its resident host application. Additionally, multiple host applications are burdened with the added complexity of coordinating data from each of their respective check-processing machines with each other.

An example of a "host application" is a program to control a check-processing machine in capturing preselected image types, deciding what type of endorsement to print on the check, and which sorting pocket should receive the processed document. Such a host application could additionally communicate with a remote site for transfer of captured images for purposes such as archiving, amount entry or remittance.

With reference to FIG. 2, traditional systems comprising a plurality of document processing machines 200a, 200b, and 200c require dedicated central processors 202a, 202b and 202c for each document processing machine 200a,b,c.

Recently, the concept of a check reading/processing machine that is relatively small and economical enough to enable a bank to have several distributed such machines at each of its branches has been developed. This device, often referred to as a "teller/scanner" machine, is designed to quickly preprocess checks at the intake point of the branch office and to send data to a host computer at the financial institution's central processing center. This results in faster and more economical processing of the banking documents. This new teller/scanner device has been found best utilized in a network of a plurality of such teller/scanners. However, to avoid wasting excess capacity of associating a controlling processor unit with each of the multiple teller/scanner units, there is seen to be a need in the field of document processor systems for simplifying application host programs used by a plurality of machines while eliminating wasted processing capacity of multiple central processors.

SUMMARY OF THE INVENTION

Our solution takes advantage of a typical central processor's excess processing power by arranging for control of a plurality of teller/scanner machines by a single application program resident on a single related controlling processor.

In accordance with the invention, an interface for enabling a single application program, resident on a control processor, to communicate with any one of a plurality of machines to be controlled by the application program comprises a virtual machine manager in communication with the application program and with each of the plurality of machines, the virtual machine manager operative to present the plurality of machines as a single virtual machine to the application program.

In accordance with another aspect of the invention, a method of providing simplified communications among a host application program and a plurality of physical machines to be controlled by the host comprises the steps of providing a virtual machine manager in communication with the host and with each of the plurality of physical machines and making the plurality of physical machines, via the virtual machine manager, appear as a single unit to the host.

BRIEF DESCRIPTION OF THE DRAWING

The objects and features of the invention will become apparent from a reading of a detailed description of a preferred embodiment, taken in conjunction with the drawing, in which.

DETAILED DESCRIPTION

Figure 1:
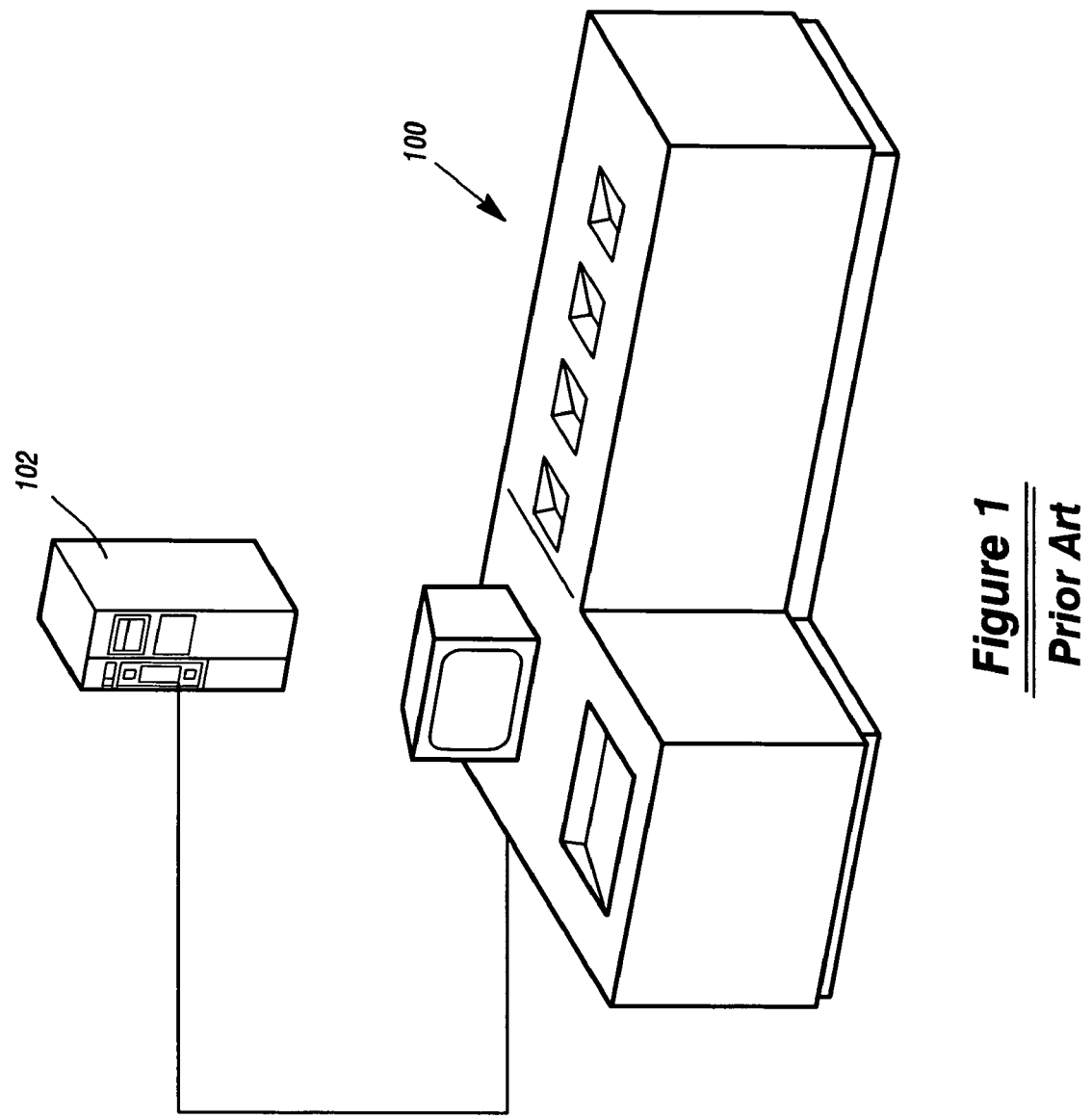
FIG. 1 is a system block diagram of a prior art check processing arrangement.
Figure 2:
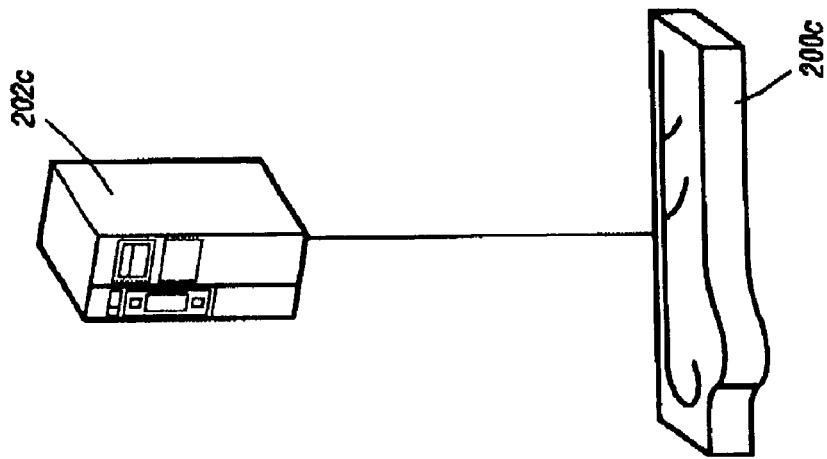
FIG. 2 is a prior art arrangement showing a plurality of check processing machines, each having a dedicated control processor.
Figure 2:
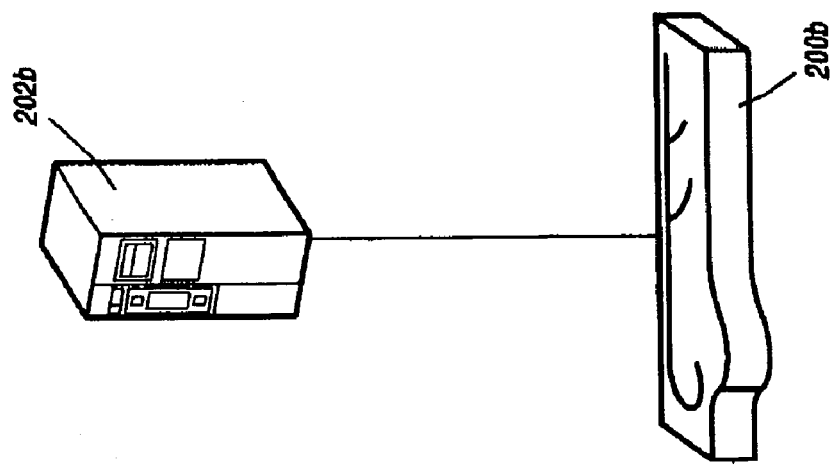
Figure 2:
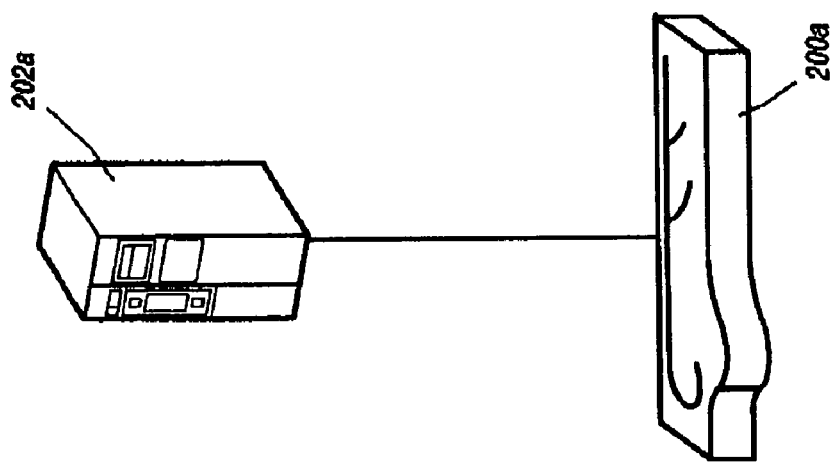
Figure 3:
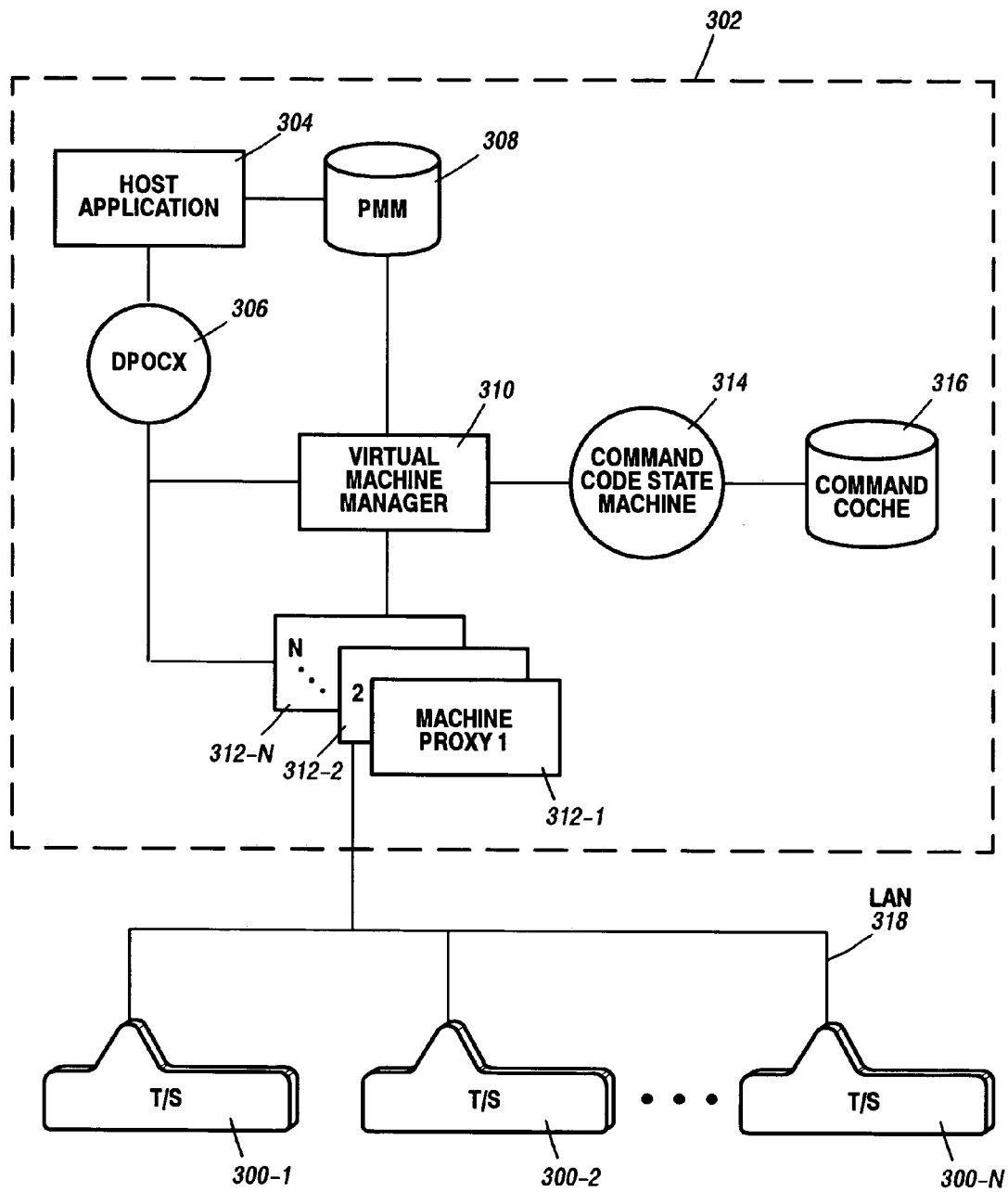
FIG. 3 is a functional block diagram of a system of teller/scanner units arranged in accordance with the principles of the invention.

Referring to FIGS. 2 and 3, one may note the difference between two different types of systems utilizing multiple low-speed check processing machines—a traditional system composed of multiple machines 200a,b,c (FIG. 2) and a system arranged in accordance with the invention using multiple teller/scanner machines 300-1 to 300-N. Note that the traditional system of FIG. 2 requires a separate processor/host application pair 202a,b,c for each check-processing machine 200a,b,c whereas the system of FIG. 3 using the multiple teller/scanners 300-1 to 300-N requires only a single controlling processor 302 with a resident host application 304. Furthermore, the host application 304 controlling the multiple teller/scanner machines can be the same host application that is used to control the older single document processor units 202a,b or c of FIG. 2.

The object of the invention is to make the multiple teller/scanner machines 300-1 through 300N of FIG. 3 appear as a single input unit to the central processor host application 304. This "virtual machine" approach is implemented by the functional units set forth in FIG. 3. Typically, these virtual machine elements are resident on the same control processor 302 as the host application 304.

The virtual machine manager 310 provides the crux of the interface between the host application 304 and all connected teller/scanner machines 300-1 to 300N. By communicating with the virtual machine manger 310 instead of the individual teller/scanner machines 300-1 to 300-N, host application 304 can be simplified. Virtual machine manager 310 hides the complexity of the asynchronous state changes of the individual teller/scanner machines 300.

Virtual machine manager 310 builds the application command cache 316 and saves a copy of the most recent, valid set of initialization commands received from the host application. As newly activated teller/scanner machines 300 power-up and connect to virtual machine manager 310 via a computer network, such as a local area network 318, manager 310 creates a machine proxy 312 to serve as an interface between host application 304 and the newly connected teller/scanner unit 300.

Any initialization commands in the cache 316 are sent to the actual teller/scanner machine 300-1 to 300-N by the machine proxy 312-1 to 312-N, respectively, from the application command cache 316. As host application 304 sends initialization commands to manager 310, manager 310 forwards those commands directly to any existing machine proxies 312, as well as to the command cache 316 for use by future machine proxies 312 as they are created by the virtual machine manager 310.

As each teller/scanner machine 300 comes on-line to local area network 318, it broadcasts its identification on network 318, advising the virtual manger 310 that it is "alive". Virtual machine manager 310 then creates a corresponding machine proxy 312 to represent the actual teller/scanner machine 300 for use by the single host application 304. Machine proxy 312 assigns an address to its corresponding teller/scanner 300, assigns a logical identifier to that teller/scanner 300, obtains all initialization commands from the application command cache 316 and sends these commands to its corresponding teller/scanner machine 300.

When a teller/scanner machine 300 disconnects from local area network 318, the corresponding machine proxy 312 generates responses to any document-related commands for which that teller/scanner 300 has failed to provide a response. Thus, a host application 304 is not negatively impacted when one of several attached teller/scanner machines disconnects while the host application is processing documents.

Command cache 316 stores the most recent initialization commands that the host application 304 has sent to the virtual machine manager 310. Note that typical operation of a check processing machine 300 involves several initialization commands, followed by one or more document processing commands, and finally by several uninitialization commands. The initialization commands are complemented with a corresponding uninitialization command, each creating a system of pairs of initialization/uninitialization command sets.

For example, if there is a power-up command, then that command is canceled or complemented by a power-down command. In most check processing systems, the following types of initialization/uninitialization command pairs are provided:

1.) power-up/power-down;
2.) go ready (configure)/go idle;
3.) start document flow/stop document flow.

In general, an initialization command is saved in the application cache 316 while an uninitialization command results in a deletion of its corresponding initialization command from cache 316. Whether a command is stored or results in a deletion of a queued command is determined by a command cache state machine 314. Command cache state machine 314 provides a mechanism for allowing the virtual machine manager 310 to determine what to do with initialized/uninitialized commands as they are received from host application 304. The state machine 314 is defined by the state transition diagram of FIG. 4.

Figure 4:
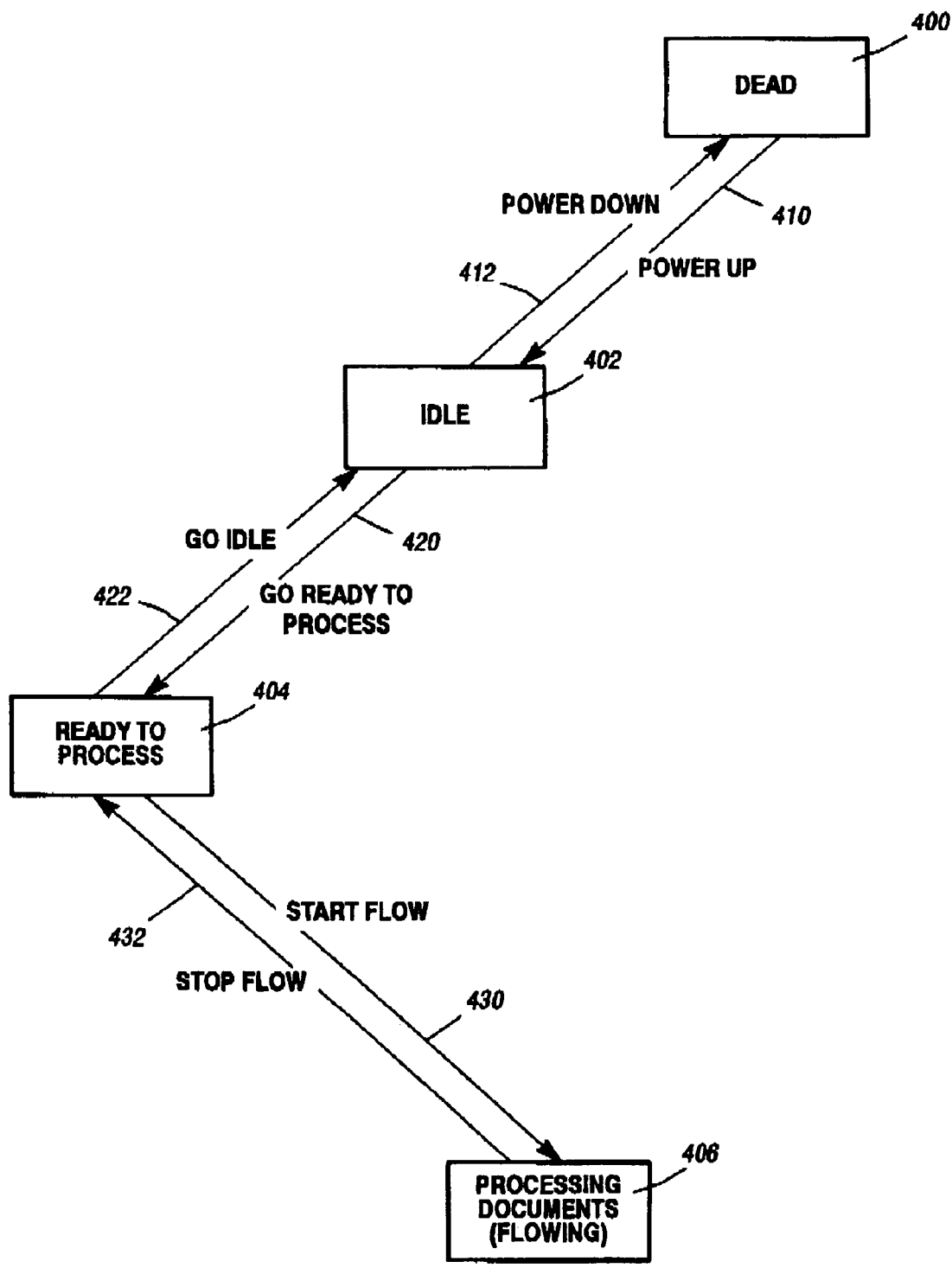
FIG. 4 is a state transition diagram for the command cache state machine of FIG. 3.

With reference to FIG. 4, command cache state machine 314 handles the above three pairs of complementary application commands in the manner set forth in the transition diagram. In the inactive or "dead" state 400, receipt of a power-up command from the host application would result in transition 410 to idle state 402. Any subsequent complementary power-down command received at this point would result in transition 412 back to dead state 400.

If the state machine is in idle state 402 and the application host generates a ready to process order via the command cache, then the state change indicated at 420 will place the command cache state machine in the ready-to-process state 404. If while in this state, the complementary go idle command is received from the host, then transition 422 will place the state machine back in the idle state 402.

While in ready-to-process state 404, if the host application generates a start document flow command, then transition 430 will place the state machine in processing document state 406. If the host tells the document processor or teller/scanner to stop processing documents while in state 406, then transition 432 returns the machine state to 404, or ready to process.

Returning to FIG. 3, whereas host application 304 may not be required to determine the identity of each teller/scanner 300, or how many physical teller/scanner machines are attached to central processor 302 via the computer network 318, virtual machine manager 310 provides an optional mechanism for allowing host application 304 to uniquely identify each physical teller/scanner machine 300-1 to N if desired. This is accomplished through physical machine map 308. Structure 308 can be created by host application 304 and stored on the file system of central processor 302 for use by virtual machine manager 310 to map a specific logical identifier (e.g. 1 through N) to one or more teller/scanner machines 300-1 to N as those machines come on-line to local area network 318. Structure 308 comprises a list that maps a physical identifier of a teller/scanner machine, such as its serial number, to a host application-supplied logical identifier (1-N). As each teller/scanner machine 300 comes "alive", that machine broadcasts its serial number over local area network 318. If a mapping to a specific logical identifier has been supplied in the physical machine map 308, then the virtual machine manager 310 assigns that logical identifier to that specific teller/scanner machine 300.

Element 306 of FIG. 3 comprises a common or universal interface between host application 304 and the virtual machine. Such a universal interface allows communication between the same virtual machine manager and a variety of different host applications, without the necessity of altering the virtual machine manager to accommodate a different host. A preferred form of such a universal interface is a document processor OLE Custom Control, or DPOCX. This type of universal interface is described in U.S. patent application Ser. No. 08/993,454, filed Dec. 18, 1997, assigned to the Assignee of this application, and hereby incorporated by reference.

Interface 306 is enhanced to support the functionality that is unique to each teller/scanner 300, such as:

1.) filtering red ink from document images;
2.) printing of Hangul characters on the back of each document;
3.) selectively stopping individual documents while still in a teller/scanner document track;

4.) allowing a host application 304 to uniquely identify each attached teller/scanner 300; and 5.) providing identification of each teller/scanner machine 300 when multiple teller/scanner machines are attached to a single host application 304 as shown in FIG. 3.

Each machine proxy 312 and the virtual machine manager 310 communicates with the interface 306 through semaphore-protected shared memory. This approach enables each of the machine proxies 312-1 to N to be executing concurrently without interfering with each other's communications with the host 304.

With the arrangement of FIG. 3, the virtual machine centered around virtual machine manager 310 provides a single interface to host application 304 which conceals the plurality of teller/scanner machines 300-1 to N from the host 304 by making the teller/scanners appear as a single entity.

The invention has been described with reference to an exemplary embodiment for the sake of example only. The scope and spirit of the invention are to be determined from a proper interpretation of the appended claims.

We claim:

1. An interface for enabling a single application program (304), resident on a control processor (302), to communicate with any one of a plurality of machines (300) to be controlled by the application program (304), the interface comprising:
    a virtual machine manager (310) in communication with the application program (304) and with each of the plurality of machines (300) that is active and operative to present the plurality of active machines (300) as a single virtual machine to the application program (304), wherein the virtual machine manager (310) is further operative to create a machine proxy for each active machine to be controlled, each machine proxy in communication with its respective active controlled machine.

2. The interface of claim 1, wherein the machine proxies communicate with respective controlled machines via a computer network.

3. The interface of claim 2, further comprising a command cache in communication with the virtual machine manager for receiving commands from the application program, and for communicating to a machine to be controlled via a respective machine proxy as it is created by the virtual machine manager.

4. The interface of claim 3, further comprising a command cache state machine, wherein the command cache includes queued commands and wherein the virtual machine manager determines whether to store a received command or delete a queued command in the command cache based on the determination of the command cache state machine.

5. The interface of claim 1 further comprising a physical machine map in communication with the virtual machine manger, the physical machine map enabling the application program to determine, via the virtual machine manager, a physical identifier for each of the plurality of machines to be controlled.

6. The interface of claim 5, wherein the physical machine map maps the physical identifier of at least one of the plurality of machines to be controlled with a unique logical identifier determined by the application program.

7. The interface of claim 6, wherein the physical identifier comprises a serial number of a machine to be controlled.

8. The interface of claim 1 further comprising a universal interface coupling the application program to the virtual machine manager and the machine proxies such that a variety of different application programs may be used with the same virtual machine manager.

9. The interface of claim 8, wherein the virtual machine manager and the machine proxies communicate with the universal interface via semaphore-protected shared memory.

10. An interface for enabling a single host application program (304), resident on a control processor (302), to communicate with any one of a plurality of document processors (300) to be controlled by the host application program (304), the interface comprising:
    a virtual machine manager (310) in communication with the host (304) and with each of the plurality of document processors (300) that is in an active state via a computer network (318), and operative to present the plurality of document processors (300) as a single virtual machine to the host (304), wherein the virtual machine manager (310) is further operative to create a machine proxy for each document processor indicating an active state, each machine proxy in communication with its respective active document processor via the computer network.

11. The interface of claim 10, wherein the computer network comprises a local area network (LAN).

12. The interface of claim 10, further comprising a command cache in communication with the virtual machine manager for receiving commands from the host, and for communicating the commands to a document processor via a respective machine proxy when the document processor indicates an active state, and further comprising a command cache state machine, wherein the command cache is loaded and unloaded with commands in accordance with a state of the command cache state machine.

13. The interface of claim 12 further comprising a physical machine map in communication with the virtual machine manager, the map enabling the host to determine, via the virtual machine manager, a physical identifier, such as a serial number, of any of the plurality of document processors.

14. The interface of claim 13, wherein the physical machine map maps the physical identifier of at least one of the plurality of document processors with a unique logical identifier determined by the host.

15. The interface of claim 10 further comprising an object-oriented exchange medium coupling the host to the virtual machine manager and the machine proxies, such that a variety of different host applications may be used with the same virtual machine manager.

16. A method of providing simplified communications among a host application program (304) and a plurality of physical machines (300) to be controlled by the host (304), the method comprising the steps of:
    providing a virtual machine manager (310) in communication with the host (304) and with each of the plurality of physical machines (300);
    creating, via the virtual machine manager, a machine proxy for each physical machine to be controlled and placing each created proxy in communication with its associated physical machine; and
    providing a command cache in communication with the virtual machine manager for receiving commands from the host, and for communicating the commands to a machine to be controlled via a respective machine proxy as it is created by the virtual machine manager, wherein the command cache is loaded and unloaded with commands in accordance with a state of a command cache state machine, whereby the plurality of physical machines (300), via the virtual machine manager (310), appear as a single virtual unit to the host (304).

17. The method of claim 16, further comprising the steps of:
creating a unique logical identifier via the host for each physical machine to be controlled;
creating a physical machine map via the host, the machine map for associating the logical identifier for a physical machine to be controlled with a physical identifier of the physical machine to be controlled;
transmitting the physical identifier of the physical machine to its associated machine proxy; and
assigning the logical identifier to the physical machine via the virtual machine manager.

18. The method of claim 17, wherein the machine proxies communicate with their associated physical machines via a computer network.

19. The method of claim 18, wherein the host communicates with the virtual machine manager and the proxies via a universal interface.

* * * * *